United States Patent
Paik

(10) Patent No.: US 9,391,536 B2
(45) Date of Patent: Jul. 12, 2016

(54) METHOD FOR PROVIDING LOW VOLTAGE DC POWER FROM AC MAINS POWER

(75) Inventor: Namwook Paik, Acton, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 116 days.

(21) Appl. No.: 14/381,878

(22) PCT Filed: Mar. 2, 2012

(86) PCT No.: PCT/US2012/027612
§ 371 (c)(1),
(2), (4) Date: Aug. 28, 2014

(87) PCT Pub. No.: WO2013/130110
PCT Pub. Date: Sep. 6, 2013

(65) Prior Publication Data
US 2015/0016158 A1 Jan. 15, 2015

(51) Int. Cl.
*H02M 7/217* (2006.01)
*H02M 7/12* (2006.01)
*H02M 7/155* (2006.01)
*H02M 3/07* (2006.01)

(52) U.S. Cl.
CPC .......... *H02M 7/217* (2013.01); *H02M 7/12* (2013.01); *H02M 7/1557* (2013.01); *H02M 3/07* (2013.01); *H02M 7/155* (2013.01)

(58) Field of Classification Search
CPC ............ H02P 1/54; H02P 5/00; H02M 7/155; H02M 7/1557; H02M 7/217; H02M 3/07
See application file for complete search history.

(56) References Cited

U.S. PATENT DOCUMENTS

| 6,178,100 B1 | 1/2001 | Kitano |
| 7,805,115 B1 | 9/2010 | McMorrow et al. |
| 2006/0067094 A1 | 3/2006 | Weber |

(Continued)

FOREIGN PATENT DOCUMENTS

| DE | 3624055 A1 | 1/1988 |
| DE | 10002650 A1 | 8/2001 |
| EP | 0241976 A1 | 10/1987 |
| EP | 1073189 A2 | 1/2001 |

OTHER PUBLICATIONS

Extended European Search Report from corresponding European Application No. 12870156.2 dated Oct. 13, 2015.

(Continued)

*Primary Examiner* — Fred E Finch, III
*Assistant Examiner* — Rafael O De Leon Domenech
(74) *Attorney, Agent, or Firm* — Lando & Anastasi, LLP

(57) ABSTRACT

According to one aspect, embodiments of the invention provide a power supply system comprising an input line configured to receive input AC power, a first capacitor coupled to the input line, a second capacitor, a controller, a rectifier having an input coupled to the first capacitor and an output coupled to the second capacitor, the second capacitor further coupled to the controller, and a switch selectively coupled across the first capacitor, and configured to selectively bypass the first capacitor, wherein the controller is configured to detect a voltage across the second capacitor, operate the switch to charge the second capacitor at a first rate if the voltage is above a predetermined threshold, and operate the switch to charge the second capacitor at a second rate if the voltage is below a predetermined threshold.

20 Claims, 4 Drawing Sheets

(56) References Cited

U.S. PATENT DOCUMENTS

2010/0084918 A1    4/2010   Fells et al.
2010/0148582 A1    6/2010   Carter
2010/0207664 A1    8/2010   Hsu
2011/0222849 A1*   9/2011   Han .................. H04B 10/1149
                                                                                 398/25

OTHER PUBLICATIONS

Notification of Transmittal of the International Search Report and the Written Opinion of the International Searching Authority from corresponding PCT/US2012/027612 dated Jun. 28, 2012.

* cited by examiner

METHOD FOR PROVIDING LOW VOLTAGE DC POWER FROM AC MAINS POWER

This application is a National Stage Application under 35 U.S.C. §371 from PCT/US2012/027612, filed Mar. 2, 2012, which is hereby incorporated by reference in its entirety for all purposes.

BACKGROUND OF INVENTION

1. Field of the Invention

At least one example in accordance with the present invention relates generally to providing low voltage DC power to a controller from AC mains.

2. Discussion of Related Art

With the advent of modern microelectronics, the DC voltage levels necessary to power microelectronic circuits has been dropping, to the point where the latest microprocessors can run from a supply as low as 0.8 Vdc. However, typical embedded microcontrollers used in many industrial products run from DC supplies ranging from 1.8 to 3.3 Vdc. The current levels required for these devices may range from 145 A (for the latest, most powerful quad-core processor) to microamperes (for the latest, low-power controllers). These low power controllers are oftentimes utilized in the distributed sensors and actuators of emerging applications such as "Smart Outlets" or a "Smart Grid".

In the home automation and energy efficiency market, the demand for "Smart Outlets", "Smart Grids" and other intelligent power products that are more cost and energy efficient is quickly growing. For example, such "Smart Outlets" may prevent the flow of energy to an outlet when it detects that a device coupled to the outlet has gone into standby mode. Additionally, a plurality of "Smart Outlets" may also be networked together to more efficiently monitor and control the distribution of power to the plurality of outlets. On a larger scale, a "Smart Grid" is an electrical grid that gathers, distributes and acts on information regarding the behavior of suppliers and consumers coupled to the grid to improve the efficiency of the electrical grid. As mentioned above, microelectronic devices (e.g., sensors, actuators, controllers, processors etc.) within "Smart Outlets" or "Smart Grids" often utilize low-power controllers.

When low-power controllers receive power from the AC mains, there are two commonly used methods to provide the necessary low-power from AC mains: 1) a small Switch Mode Power Supply (SMPS) and 2) a capacitor (cap) dropper circuit. A cap dropper circuit is often used when a low current (e.g., <30 mA average) DC supply that is not galvanically isolated from the AC mains is sufficient. A cap dropper circuit typically utilizes a series capacitive voltage divider to provide the desired low power.

SUMMARY OF THE INVENTION

Aspects in accord with the present invention are directed to a power supply system comprising an input line configured to receive input AC power, a first capacitor coupled to the input line, a second capacitor, a controller, a rectifier having an input coupled to the first capacitor and an output coupled to the second capacitor, the second capacitor further coupled to the controller, and a switch selectively coupled across the first capacitor, and configured to selectively bypass the first capacitor, wherein the controller is configured to detect a voltage across the second capacitor, operate the switch to charge the second capacitor at a first rate if the voltage is above a predetermined threshold, and operate the switch to charge the second capacitor at a second rate if the voltage is below a predetermined threshold.

According to one embodiment, operate the switch to charge the second capacitor at a first rate includes opening the switch to couple the first capacitor in series with the second capacitor. In another embodiment, operate the switch to charge the second capacitor at a second rate includes closing the switch to bypass the first resistor. In one embodiment, the first rate is less than the second rate.

According to another embodiment, the controller is further configured to close the switch to charge the second capacitor at the second rate if the voltage across the second capacitor is insufficient to meet operation of the controller in a second higher power mode of operation, and after closing the switch, operate the controller in the second higher power mode of operation.

According to one embodiment, the power supply system further comprises a resistor having a resistance value of about 7.2 kΩ coupled between the input line and the switch. In another embodiment, the first capacitor has a value in the range of 1-4.7 nF.

According to another embodiment, the power supply system further comprises an AC coil coupled between the input and the first capacitor. In one embodiment, the controller is further configured to open the switch upon detection that a voltage across the AC coil is at a predetermined level.

According to one embodiment, the controller is further configured to close the switch to provide a path to power a load. In another embodiment, the switch is at least one of a TRIAC driver and a FET.

Another aspect in accord with the present invention is directed to a method for generating DC power from an AC input line, the method comprising receiving input AC power from an AC power source coupled to the AC input line, rectifying the input AC power to generate rectified DC power, charging a capacitor with the rectified DC power at a first rate in response to a determination that voltage across the capacitor is above a threshold, and charging the capacitor with the rectified DC power at a second rate in response to a determination that voltage across the capacitor is below the threshold.

According to one embodiment, charging the capacitor at the first rate includes charging the capacitor with rectified DC power provided by a capacitive voltage divider coupled to the AC input line. In another embodiment, charging the capacitor at the second rate includes charging the capacitor with rectified DC power provided by an RC charging circuit coupled to the AC input line.

According to another embodiment, charging the capacitor at the second rate includes selectively bypassing a portion of the capacitive voltage divider. In one embodiment, selectively bypassing a portion of the capacitive voltage divider includes selectively coupling the AC input line to the rectifier, bypassing a first capacitor of the capacitive voltage divider. In another embodiment, the second rate is greater than the first rate.

According to one embodiment, the method further comprises analyzing future power requirements of a load, and charging the capacitor at the second rate in response to a determination that voltage across the capacitor is insufficient to provide the future power requirements of the load.

Aspects in accord with the present invention are also directed to a power supply system comprising an input line configured to receive input AC power, power supply circuitry coupled to the input line, a controller coupled to the power supply circuitry and configured to operate from DC power derived from the input AC power, and means for controlling the power supply circuitry to selectively provide additional DC power to the controller.

According to one embodiment, the power supply system further comprises means for anticipating future power needs of the controller and for operating the power circuitry to provide additional DC power to the controller to meet the future power needs.

BRIEF DESCRIPTION OF DRAWINGS

The accompanying drawings are not intended to be drawn to scale. In the drawings, each identical or nearly identical component that is illustrated in various FIGS. is represented by a like numeral. For purposes of clarity, not every component may be labeled in every drawing. In the drawings.

DETAILED DESCRIPTION

Figure 1:
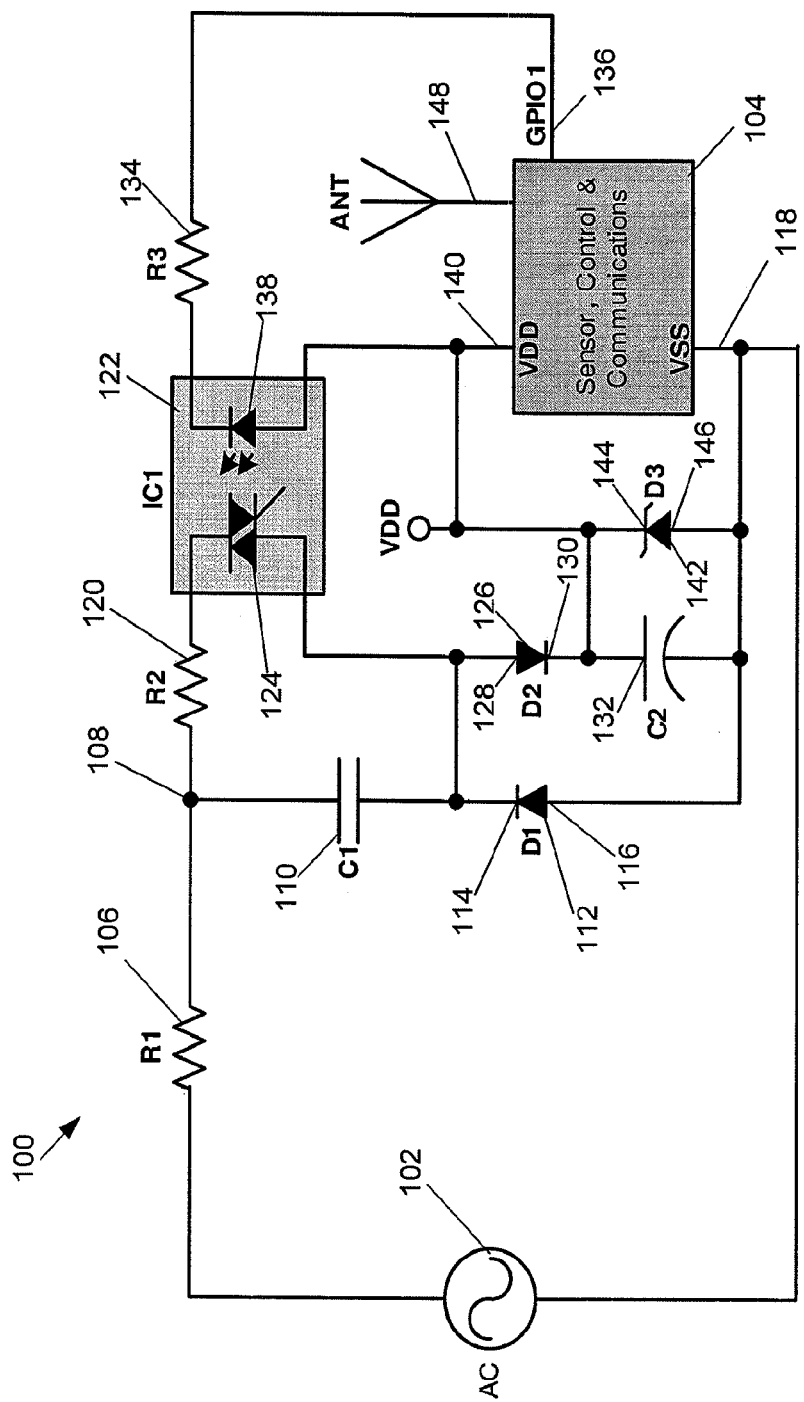
FIG. 1 is a circuit diagram of a power circuit in accordance with aspects of the present invention.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, cap dropper circuits are commonly utilized to provide low-power to a load from AC mains. Cap dropper circuits are typically relatively large circuits and therefore are oftentimes used in larger electronics such as home appliances with ancillary electronic functions (e.g., like a digital clock, smart meter, LED light, fire/smoke detector etc.). Due to the relatively large size of a typical cap dropper circuit (especially compared to the amount of power they provide), they are generally not as useful in providing power to microelectronic devices (e.g., such as a relatively small low-power controller), where space is at a premium. In addition to size constraints, typical cap dropper circuits, and controllers coupled to them, may also be susceptible to damage and interference from high frequency spikes and noise, which may travel unimpeded through the series capacitive voltage divider.

Due to advances in semiconductor manufacturing technology, modern microcontrollers often have more processing power (i.e. CPU cycles) and analog/digital Input/Output (I/O) pins, than are typically required for their intended applications. Therefore, at least some embodiments described herein leverage the normally wasted CPU cycles and pins to provide a power circuit that is capable of providing power to a microcontroller with improved efficiency, reliability, size, cost and power output.

FIG. 1 is a circuit diagram including a power circuit 100 coupled between an AC mains source 102 and a controller 104 in accordance with one embodiment. The power circuit 100 is configured to provide low DC power to the controller 104 from the AC mains source 102.

The power circuit 100 includes a first resistor 106 coupled between the AC mains source 102 and a node 108. According to one embodiment, the value of the first resistor 106 is relatively large (e.g., 7.2 kΩ vs. 220 Ω of a resistor within a typical cap dropper circuit). A first capacitor 110 is coupled between the node 108 and the cathode 114 of a first diode 112. The anode 116 of the first diode 112 is coupled to a negative supply line 118, which is also coupled to the controller 104. A second resistor 120 is coupled between the node 108 and a TRIAC 124 of an opto-isolated TRIAC driver 122. The TRIAC 124 is coupled between the second resistor 120 and the anode 128 of a second diode 126. The anode 128 of the second diode 126 and the cathode 114 of the first diode 112 are also coupled together. A second capacitor 132 is coupled between the cathode 130 of the second diode and the negative supply line 118.

A third resistor 134 is coupled between a General Purpose Input/Output (GPIO) 136 of the controller 104 and an LED 138 of the opto-isolated TRIAC driver 122. The LED 138 is also coupled to a positive supply line 140, which is coupled to the controller 104. The cathode 144 of a zener diode 142 is coupled to the positive supply line 140. The anode 146 of the zener diode 142 is coupled to the negative supply line 118. The cathode 144 of the zener diode 142 is also coupled to the cathode 130 of the second diode 126. According to one embodiment, the controller 104 is also coupled to an antenna 148.

As AC power is provided to the power circuit 100 by the AC mains source 102, the AC power is rectified by the first diode 112 and the second diode 126 and the resulting rectified signal is provided to the second capacitor 132 to begin charging the second capacitor 132. The amount of voltage provided to the second capacitor 132 is determined by the value of the first capacitor 110, as the first capacitor 110 and the second capacitor 132 form a capacitive voltage divider. The peak charging current provided to the second capacitor 132 is determined by the value of the first resistor 106. As described above, according to one embodiment, the value of the first resistor 106 is relatively large (e.g., about 7.2 kΩ), and as a result, the second capacitor 132 is charged relatively slowly. Once the second capacitor 132 is charged to a level sufficient to power on the controller 104, the controller 104 is powered on with power from the second capacitor 132.

According to one embodiment, upon being powered on, the controller 104 monitors the voltage across the second capacitor 132 (i.e. VDD). According to one embodiment, the controller 104 includes an Analog to Digital (A/D) converter for measuring the voltage across the second capacitor 132. If VDD falls below a predetermined threshold (e.g., a voltage level just above a minimum level capable of powering the controller 104), the controller 104 turns on the TRIAC 124 of the TRIAC driver 122. In another embodiment, upon being powered on, the controller 104 immediately turns on the TRIAC 124 to prevent VDD from dropping below the minimum level capable of powering the controller 104.

The controller 104 turns on the TRIAC 124 by driving the GPIO 136 low which as a result, turns on the LED 138 of the TRIAC driver 122. Once the TRIAC 124 is turned on, current from the AC mains source 102 bypasses the first capacitor 110, passes through the TRIAC 124, is rectified by the first diode 112 and the second diode 126, and is provided to the second capacitor 132 to charge the second capacitor 132.

When the TRIAC 124 is on and the first capacitor 110 is bypassed, the second capacitor 132 charges at a faster rate then when the TRIAC 124 is off. By turning on the TRIAC 124, the controller 104 is able to quickly boost the energy stored on the second capacitor 132 (i.e., the energy available to power the controller 104).

When the TRIAC 124 is turned on, the second capacitor 132 charges at a faster rate because the first resistor 106 is no longer in series with the first capacitor 110 and the charging current through the first resistor 106 and second resistor 120 bypasses the relatively high impedance first capacitor 110. The value of the first resistor 106 determines the peak charging current provided to the second capacitor 132. The voltage provided to the second capacitor 132 is determined by the RC charging circuit of the first resistor 106 and the second resistor 120 combined with the second capacitor 132 (i.e., as opposed to the series capacitive divider of the first capacitor 110 and the second capacitor 132 when the TRIAC 124 is off).

When the TRIAC 124 is on, current out of the first capacitor 110 is limited by the second resistor 120 and as a result, the value of the second resistor 120 can be smaller than that of the first resistor. For example, if the TRIAC's 124 peak current rating is 2 A and the AC mains voltage is 120 Vrms, then a second resistor 120 with a value of 100 Ω will limit current out of the first capacitor 110 appropriately.

After charging the second capacitor 132 to a desired level, the controller 104 turns off the TRIAC 124 of the TRIAC driver 122. The controller 104 turns off the TRIAC 124 by driving the GPIO 136 high, which as a result, turns off the LED 138 of the TRIAC driver 122. According to one embodiment, the controller 104 is configured to account for any TRIAC 124 transition delays. For example, in one embodiment, the TRIAC 124 may only be turned off when the current provided to the TRIAC 124 drops to zero or when the AC mains voltage passes through a zero-crossing.

Once the TRIAC 124 is turned off, the second capacitor 132 returns to be being charged via the series capacitive voltage divider of the first capacitor 110 and second capacitor 132 (at the slower rate).

According to one embodiment, the power circuit 100 also includes a voltage regulator coupled to the controller 104 which is configured to further regulate the voltage provided by the second capacitor 132 to the controller 104.

As described above, the controller 104 is able to quickly boost the amount of energy stored on the second capacitor 132 when the controller 104 senses that the voltage across the second capacitor 132 is not at a sufficient level to power the controller 104. In addition, according to another embodiment, the controller 104 is able to anticipate that an upcoming task is going to require more energy than is currently capable of being provided by the second capacitor 132 and in response, turn the TRIAC 124 on to boost the energy stored on the second capacitor 132. For example, prior to taking a certain action requiring a high amount of power (e.g., making a transmission via the antenna 148), the controller 104 is programmed to recognize that the task requires a higher level of power from the second capacitor 132 and as a result, the controller 104 turns on the TRIAC 124 to boost the energy stored on the second capacitor 132, as described above, prior to performing the high power task. Therefore, the controller is not only able to ensure that it is receiving enough power from the second capacitor 132 to remain powered one, but is also able to individually determine that it is going to require a higher level of power and control the power circuit 100 itself to provide the necessary higher level of power.

According to one embodiment, the TRIAC driver 122 is controlled to be turned on and off at the zero crossing of an input AC sine wave. Therefore, when determining when to turn on and off the TRIAC 124, the controller 104 takes into account that the second capacitor 132 is charged in ½ cycle increments. In another embodiment, the TRIAC driver 122 is able to be turned on at any phase of an AC sine wave but is only able to be turned off at the zero crossing of the input AC sine wave. Therefore, when determining when to turn on and off the TRIAC 124, the controller 104 takes into account the switching restrictions of the TRIAC driver 122.

Figure 2:
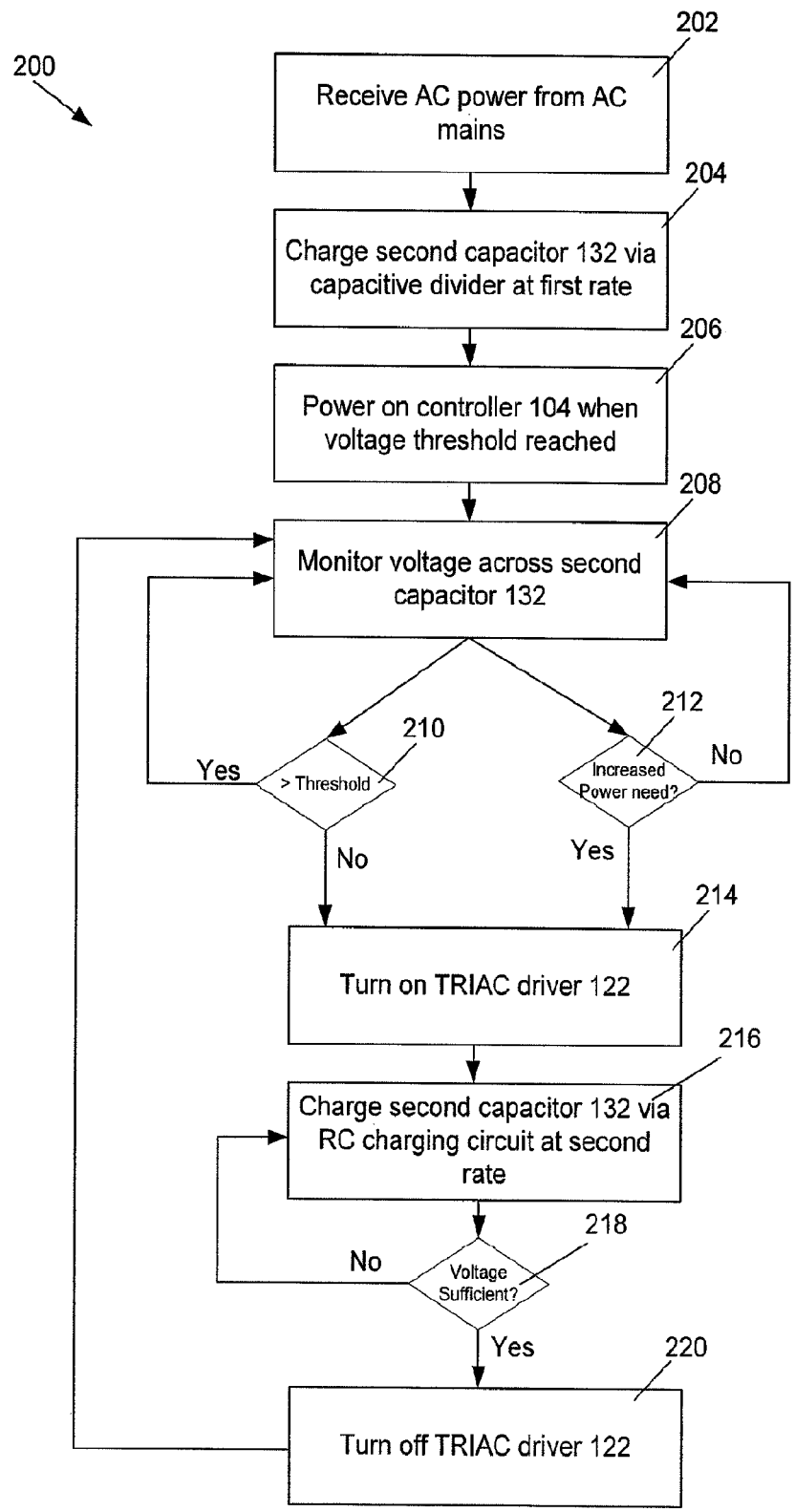
FIG. 2 is a flow chart illustrating a process for providing DC power to a controller from AC mains in accordance with aspects of the present invention.

FIG. 2 is a flow chart 200 illustrating a process for providing DC power to the controller 104 from AC mains 102. At block 202, the power circuit 100 receives AC power from the AC mains source 102. At block 204, the received AC power is rectified and provided to the second capacitor 132, via the capacitive divider (including the first capacitor 110 and second capacitor 132), to charge the second capacitor 132 at a first rate.

At block 206, the controller 104 is powered on once the voltage across the second capacitor 132 reaches a threshold level. At block 208, the powered on controller 104 monitors the voltage across the second capacitor 132.

At block 210, a determination is made whether the voltage across the second capacitor 132 is greater than a predetermined threshold (e.g., at a level sufficient to power the controller 104 or at another predefined level). In response to a determination that the voltage across the second capacitor 132 is greater than the predetermined threshold, at block 208 the controller 104 continues to monitor the voltage across the second capacitor 132. In response to a determination that the voltage across the second capacitor 132 is below the predetermined threshold, at block 214 the controller 104 turns on the TRIAC driver 122.

At block 212, a determination is made by the controller 104 whether the controller 104 is going to require an increased power level from the second capacitor 132 (i.e., to power a task which requires a high level of power). In response to a determination that the controller 104 is not going to require an increased power requirement, at block 208, the controller 104 continues to monitor the voltage across the second capacitor 132. In response to a determination that the controller 104 is going to required an increased power level, at block 214 the controller 104 turns on the TRIAC driver 122.

According to one embodiment, block 212 is optional. For example, in one embodiment, where the predetermined threshold level of voltage across the second capacitor 132 is set at a sufficiently high level and the voltage across the second capacitor is repeatedly checked at a relatively high rate (at block 208), block 212 is not necessary as the control loop comprised of blocks 208 and 210 is executed fast enough to respond (i.e., turn on the TRIAC driver 122) quickly to a sudden increase in required power (e.g., due to turning on an RF module for transmission) to prevent voltage across the second capacitor 132 from dropping too low.

Upon turning on the TRIAC driver, at block 216 the second capacitor 132 is charged via the RC charging circuit (including the first resistor 106, second resistor 120 and second capacitor 132) at a second rate which is faster than the first rate.

At block 218, a determination is made whether the voltage across the second capacitor 132 is sufficient to power the controller 104 (i.e. if the TRIAC driver 122 was turned on because the voltage across the second capacitor 132 dropped below the predetermined threshold) or sufficient to power the increased power requirements of the controller 104 (i.e. to perform a high power task). In response to a determination that the voltage across the capacitor is not sufficient, at block 216 the second capacitor 132 continues to be charged at the second rate. In response to a determination that the voltage across the second capacitor 132 is sufficient, at block 220 the TRIAC driver 122 is turned off and at block 208 the controller 104 continues to monitor the voltage across the second capacitor 132.

By allowing the controller 104 to individually determine the level of power it actually requires and to control the power circuit 100 to provide this level of power (i.e. rather than a constant maximum amount of power), certain components of the power circuit 100 may be reduced in size as the average current through the power circuit 100 is low and increased power levels may only be required over short intervals.

In addition, certain components of the power circuit 100 may also be reduced in size because they are utilized differently than in a typical cap dropper circuit. For example, according to one embodiment, because a higher percentage of the charging of the second capacitor is performed via the RC charging circuit (including the first resistor 106, the second resistor 120, and the second capacitor 132), the size of the first capacitor 110 may be reduced (e.g., from 1 µF down to 1-4.7 nF) as the first capacitor 110 is mainly utilized to initially power on the controller 104.

Additionally, the power circuit 100 may provide good surge protection to the controller 104 as the relatively large resistor 106 may act as a buffer to prevent surges from passing through the power circuit 100.

According to one embodiment, the power circuit 100 is utilized to provide power to circuits that require low average current, but high pulse currents, to reduce the power dissipation across the relatively large first resistor 106.

According to another embodiment, the dissipation of power across the relatively large first resistor 106 may be eliminated by utilizing an existing component of a circuit coupled to the power circuit 100 to replace the relatively large first resistor 106. For example, as discussed above, "Smart Outlets" typically include an embedded microcontroller to measure power and communicate with a home or building network. "Smart Outlets" also typically include an electromechanical relay to control power. In one embodiment, the impedance of a coil within the electromechanical relay can be used in place of the first resistor 106.

Figure 3:
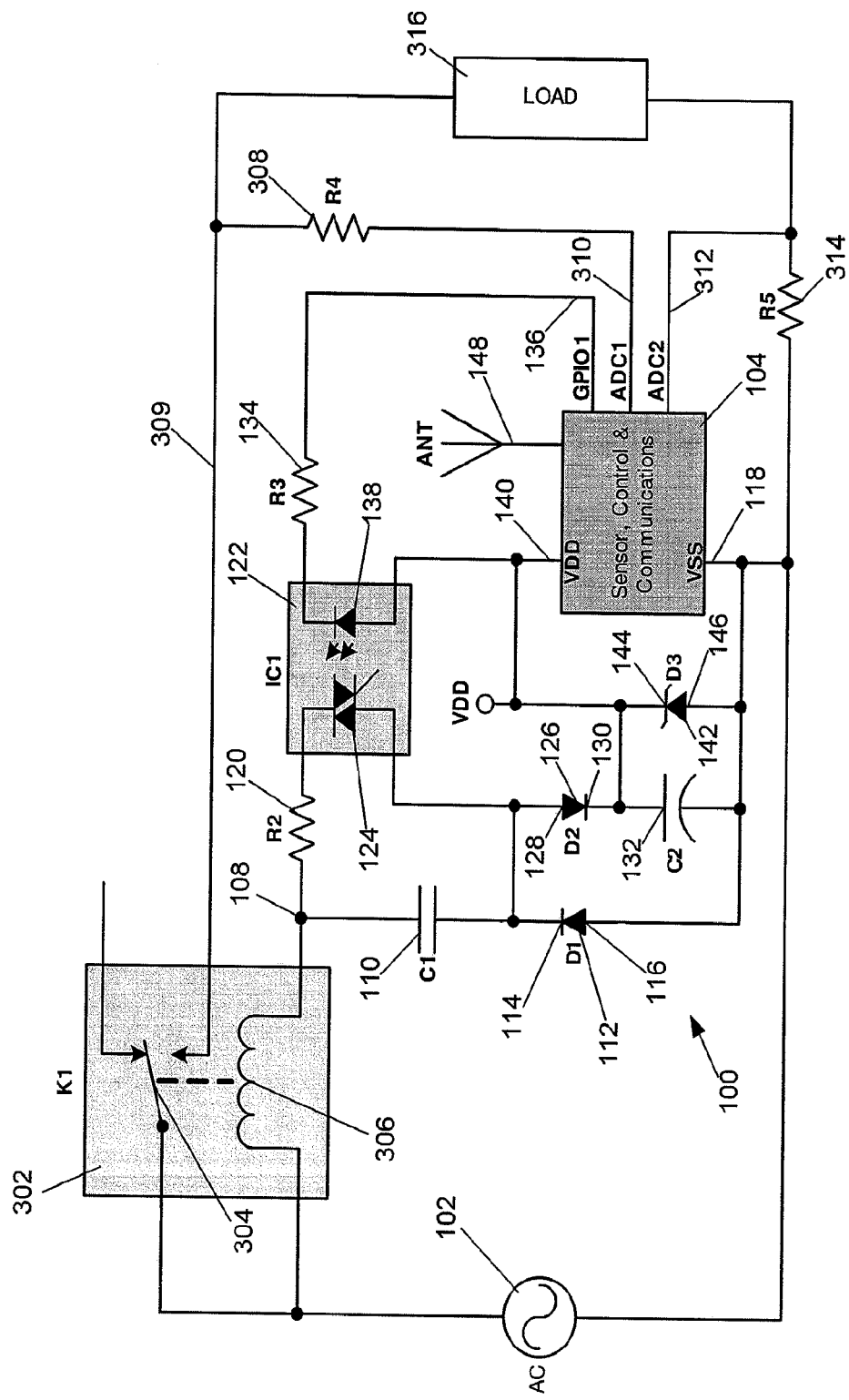
FIG. 3 is a circuit diagram of a power circuit and a "Smart Outlet" in accordance with aspects of the present invention.

For example, FIG. 3 is a circuit diagram 300 of the power circuit 100 coupled to an electromechanical relay 302 of an outlet configured to provide power to a load 316. The first resistor 106, illustrated in FIG. 1, has been replaced with the coil 306 of the electromechanical relay 302 which is coupled between the AC mains source 102 and the node 108. An armature 304 of the electromechanical relay is selectively coupled between the AC mains source 102 and an output line 309 which is coupled to the load 316.

A voltage measurement line 310 is coupled between the controller 104 and the output line 309 via a fourth resistor 308. A shunt resistor 314 is coupled between the load 316 and the negative supply line 118. A current measurement line 312 is coupled to the shunt resistor 314. The controller 104 is configured to measure the voltage on the output line 309 via the voltage measurement line 310 and to measure the current provided to the load 316 via the current measurement line 312.

As AC power is provided to the outlet and the power circuit 100, the coil 306 and the first capacitor 110 charge the second capacitor 132 at a relatively slow rate. When the voltage across the second capacitor 132 reaches a predetermined threshold capable of powering the controller 104, the controller 104 is powered on.

The controller 104 monitors the voltage across the second capacitor 132. If the voltage drops below the predetermined threshold, or the controller 104 determines that it is going to require a higher level of power to perform a specific task, the controller 104 turns on the TRIAC driver 122.

When the TRIAC driver 122 is initially turned on, the full current from the AC mains source 102 is provided to the coil 306 and current from the coil 306 charges the second capacitor 132 at a faster rate (as the first capacitor 110 is bypassed). However, at the same time, the coil 306 also begins to charge. Once the coil 306 is charged to an appropriate level, the coil 306 closes the relay armature 304. When the armature 304 is closed, and coupled to the output line 309, the majority of the current from the AC mains source 102 is redirected to the load 316 to power the load 316 and current from the coil 306 continues to pass through the TRIAC driver 122 and charge the capacitor 132.

However, a situation may arise where it is desired to keep the load unpowered (i.e. keep the armature 304 open) while at the same time charging the capacitor 132 at a faster rate to keep the controller 104 powered. Therefore, according to one embodiment, to increase the amount of current provided to the second capacitor 132 by the coil 306 over a short period of time, the controller 104 turns on the TRIAC driver 122 as discussed above to charge the second capacitor 132 at the faster rate, but turns off the TRIAC driver 122 prior to the armature 304 closing (i.e. prior to the load being powered). According to one embodiment, the controller 104 is programmed with information regarding the time required for the coil 306 to charge to a level sufficient to close the armature 304. Utilizing this information, the controller 104 is able to turn off the TRIAC driver 122 prior to the armature 304 closing. For example, according to one embodiment, the controller 104 is configured to turn off the TRIAC driver 122 before the armature 304 even begins to move. Thus, the controller 104 operates the TRIAC driver to provide short bursts of increased current to the second capacitor 132.

For example, in one embodiment, a short period of increased current is provided by utilizing a non-zero crossing TRIAC driver 122 and turning on the TRIAC driver 122 near the zero crossing (e.g. 4 ms before the zero crossing). Prior to the zero crossing, the TRIAC driver 122 is on and the second capacitor 132 is charging at a higher rate. Just before the zero crossing, the non-zero crossing TRIAC driver 122 turns off (i.e. prior to the armature 304 closing). Accordingly, the amount of charging current provided to the second capacitor 132 is determined by the time in which the TRIAC driver 122 is turned on and limited by the need to keep the armature 304 from closing.

By utilizing the impedance of a circuit component already in use, the loss due to the relatively large first resistor 120 may be eliminated. In addition, the impedance of the coil 306 may act as a buffer preventing surges and Electrostatic Discharge (ESD) from damaging the circuit. As such, an additional surge protector such as a Metal Oxide Varistor (MOV) may not be required. Similarly, the relatively large inductance of the coil 306 may act as a filter to Electromagnetic Interference (EMI) generated by the controller 104.

As described above, the circuit component utilized to replace the first resistor 106 is the coil 306 of an electromechanical relay 302; however, in other embodiments, the circuit component utilized to replace the first resistor 106 may be any type of AC load (e.g., a lamp, a motor, a transformer, etc.) In one embodiment, a small current transformer may be utilized to lower the current to a safe level while still leveraging the impedance of the load to charge the second capacitor 132. In another embodiment, the TRIAC driver of a solid state relay may be utilized rather than the electromechanical relay 302. Additionally, according to one embodiment, rather than an AC coil, a DC coil is used to replace the first resistor 106 along with a full bridge rectifier.

Figure 4:
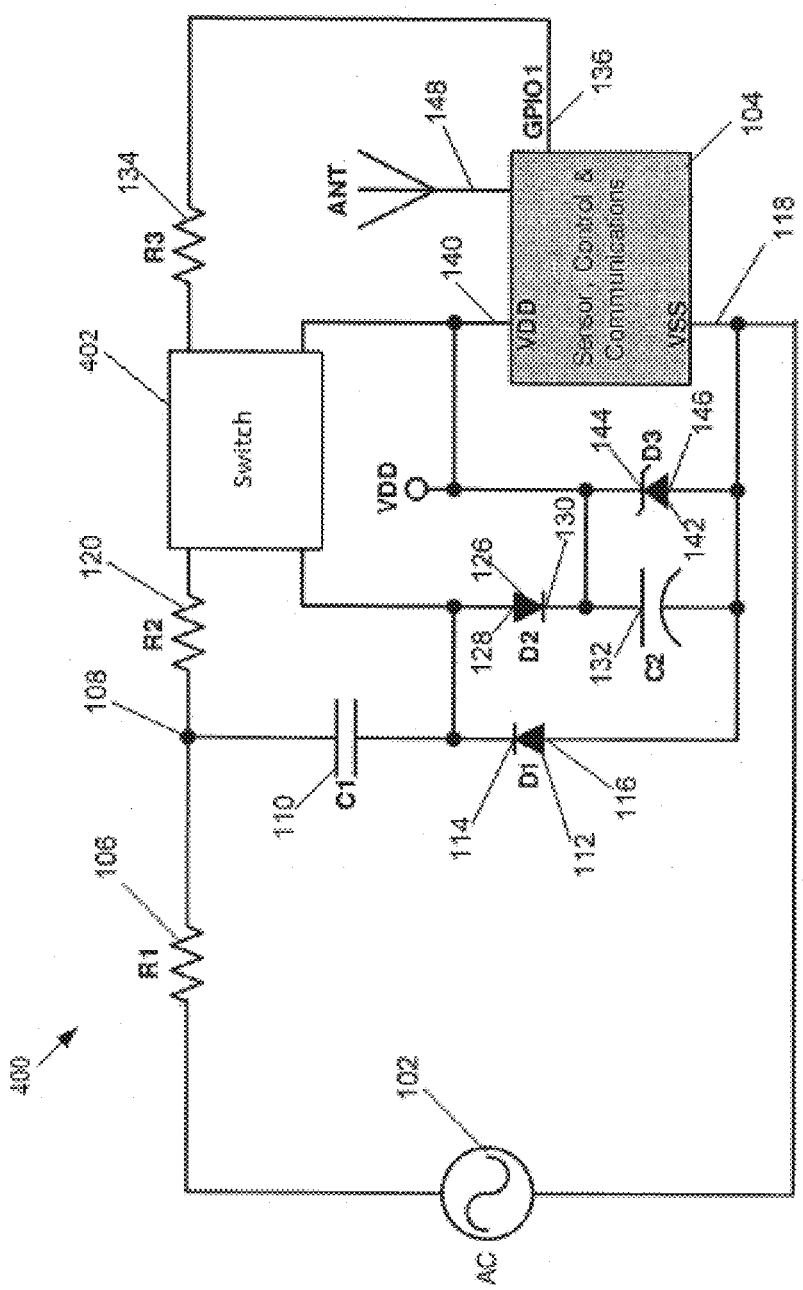
FIG. 4 is another circuit diagram of a power circuit in accordance with aspects of the present invention.

As described herein, an opto-isolated TRIAC driver is utilized to control when the second capacitor is charged more quickly; however, in other embodiments, any type of switch 402 (e.g., a transistor, a FET, etc.) may be used to control the charging of the second capacitor (e.g., as shown in the power circuit 400 of FIG. 4).

As described herein, the first diode 112 and second diode 126 form a half-wave rectifier; however, in other embodiments a full wave rectifier may be utilized, thereby increasing the current available to charge the second capacitor 132.

As described herein, a controller coupled to a power circuit leverages normally wasted CPU cycles to individually monitor the power it is capable of being provided by the power circuit, recognize the power it requires for upcoming tasks, and control the power circuit itself to provide the necessary power to the controller. Therefore the power circuit is capable of providing power to the controller with improved efficiency and reliability. In addition, as described above, certain components of the power circuit may also be reduced in size and cost.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A power supply system comprising:
an input line configured to receive input AC power;
a first capacitor coupled to the input line;
a second capacitor;
a controller coupled to the second capacitor;
a rectifier having an input coupled to the first capacitor and an output coupled to the second capacitor, the rectifier configured to convert the input AC power into rectified DC power and provide the rectified DC power to the second capacitor; and
a switch selectively coupled across the first capacitor, and configured to selectively bypass the first capacitor,
wherein the controller is configured to:
detect a voltage across the second capacitor;
operate the switch to charge the second capacitor at a first rate if the voltage is above a predetermined threshold; and
operate the switch to charge the second capacitor at a second rate if the voltage is below a predetermined threshold.

2. The power supply system of claim 1, wherein operate the switch to charge the second capacitor at a first rate includes opening the switch to couple the first capacitor in series with the second capacitor.

3. The power supply system of claim 2, wherein operate the switch to charge the second capacitor at a second rate includes closing the switch to bypass a first resistor.

4. The power supply of claim 3, wherein the first rate is less than the second rate.

5. The power supply system of claim 4, wherein the controller is further configured to:
close the switch to charge the second capacitor at the second rate if the voltage across the second capacitor is insufficient to meet operation of the controller in a second higher power mode of operation; and
after closing the switch, operate the controller in the second higher power mode of operation.

6. The power supply system of claim 1, further comprising a resistor having a resistance value of about 7.2 kΩ coupled between the input line and the switch.

7. The power supply system of claim 1, wherein the first capacitor has a value in the range of 1-4.7 nF.

8. The power supply system of claim 1, further comprising an AC coil coupled between the input and the first capacitor.

9. The power supply system of claim 8, wherein the controller is further configured to open the switch upon detection that a voltage across the AC coil is at a predetermined level.

10. The power supply system of claim 1, wherein the controller is further configured to close the switch to provide a path to power a load.

11. The power supply system of claim 1, wherein the switch is at least one of a TRIAC driver and a FET.

12. A method for generating DC power from an AC input line, the method comprising:
receiving input AC power from an AC power source coupled to the AC input line;
providing the input AC power to a rectifier having an input coupled to the AC input line via a first capacitor and an output coupled to a second capacitor;
rectifying, with the rectifier, the input AC power to generate rectified DC power;
charging the second capacitor with the rectified DC power at a first rate in response to a determination that voltage across the second capacitor is above a threshold; and
charging the second capacitor with the rectified DC power at a second rate in response to a determination that voltage across the second capacitor is below the threshold.

13. The method of claim 12, wherein the first capacitor and the second capacitor form a capacitive voltage divider coupled to the AC input line, and wherein charging the second capacitor at the first rate includes charging the second capacitor with the rectified DC power provided by the capacitive voltage divider.

14. The method of claim 13, wherein charging the second capacitor at the second rate includes charging the second capacitor with the rectified DC power provided by an RC charging circuit coupled to the AC input line.

15. The method of claim 14, wherein charging the second capacitor at the second rate includes selectively bypassing a portion of the capacitive voltage divider.

16. The method of claim 15, wherein selectively bypassing a portion of the capacitive voltage divider includes selectively coupling the AC input line to the rectifier, bypassing the first capacitor of the capacitive voltage divider.

17. The method of claim 12, wherein the second rate is greater than the first rate.

18. The method of claim 12, further comprising:
analyzing future power requirements of a load; and
charging the second capacitor at the second rate in response to a determination that voltage across the second capacitor is insufficient to provide the future power requirements of the load.

19. A power supply system comprising:
an input line configured to receive input AC power;
power supply circuitry coupled to the input line, the power supply circuitry comprising a capacitive voltage divider coupled to the input line and a rectifier coupled to the capacitive voltage divider;
a controller coupled to the power supply circuitry and configured to operate from rectified DC power provided by the rectifier and derived from the input AC power; and a switch for coupling, in a first mode of operation, the rectifier to the input line via a portion of the capacitive voltage divider such that the rectifier outputs the rectified DC power at a first current level and for coupling, in a second mode of operation, the rectifier to the input line such that the portion of the capacitive voltage divider is bypassed and the rectifier outputs the rectified DC power at a second current level.

20. The power supply system of claim 19, wherein the controller is further configured to anticipate future power needs of the controller and to operate the switch for coupling the rectifier to the input line in the first and second modes of operation based on the future power needs.

* * * * *